S. J. DUNKLEY.
MACHINE FOR PEELING PEACHES AND OTHER FRUIT.
APPLICATION FILED NOV. 29, 1904.
1,104,175.
Patented July 21, 1914.
4 SHEETS—SHEET 3.
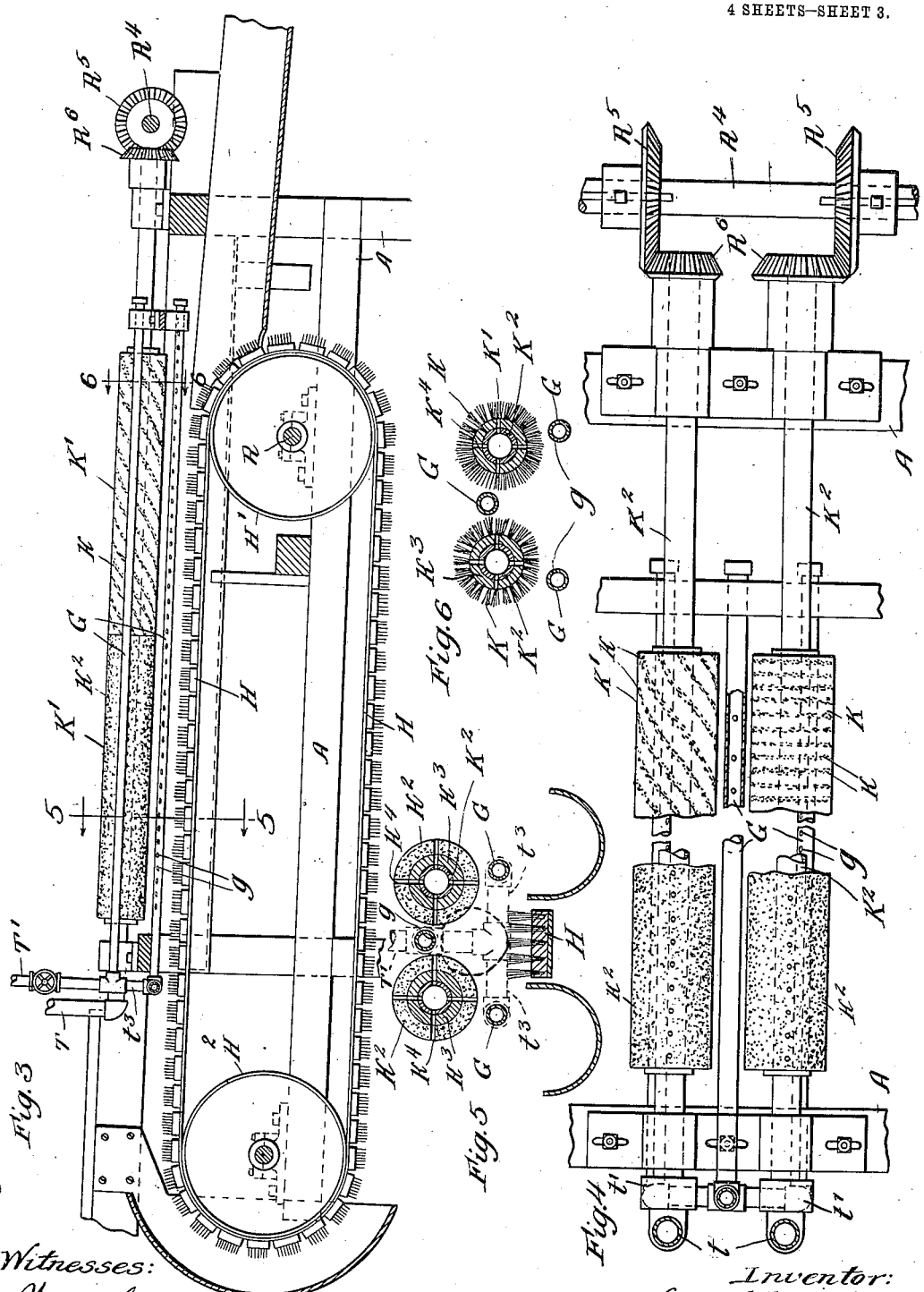
Witnesses:
Wm. Geiger
Inventor:
Samuel J. Dunkley
By Munday, Evarts & Adcock,
Attorneys

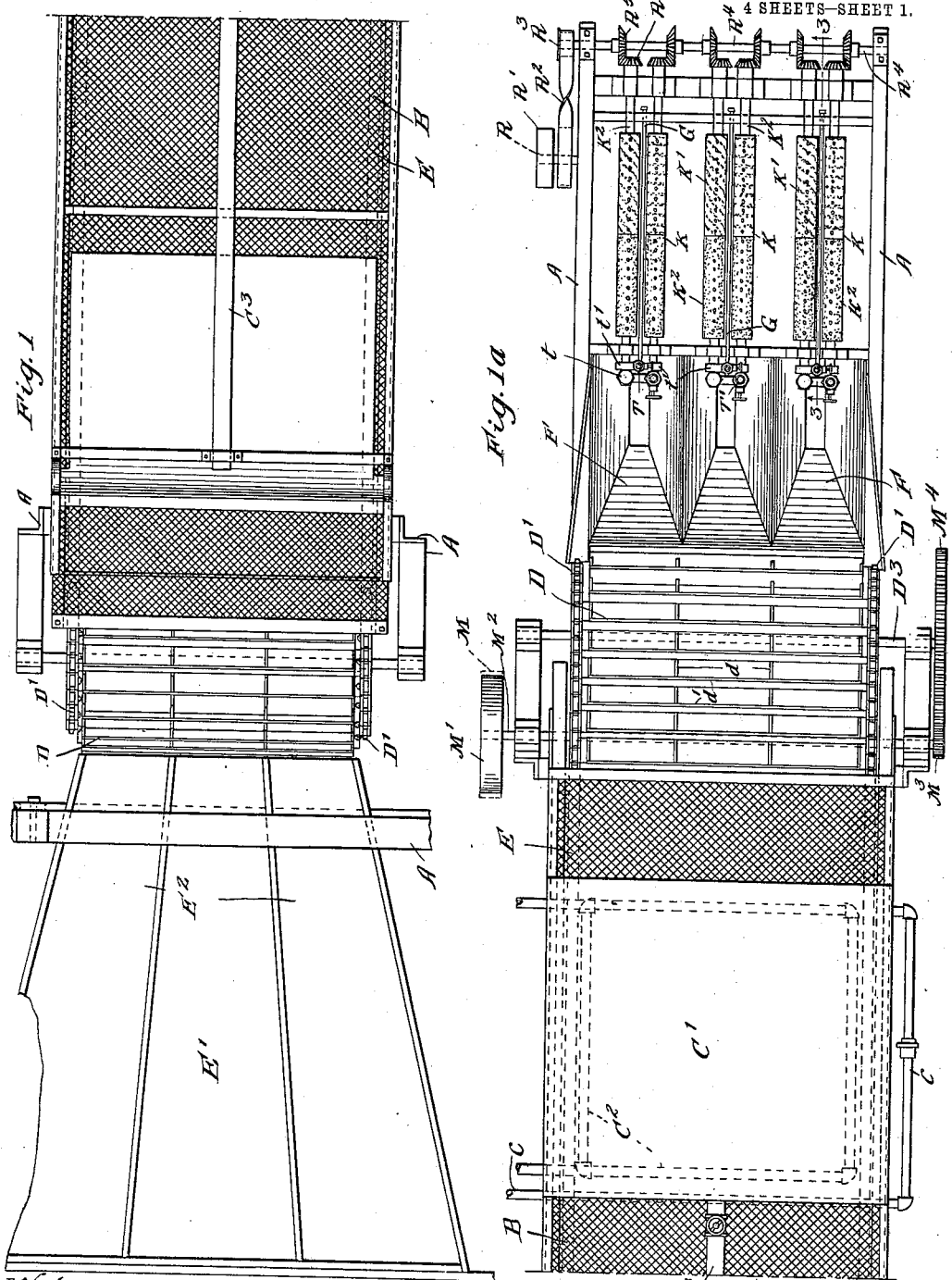

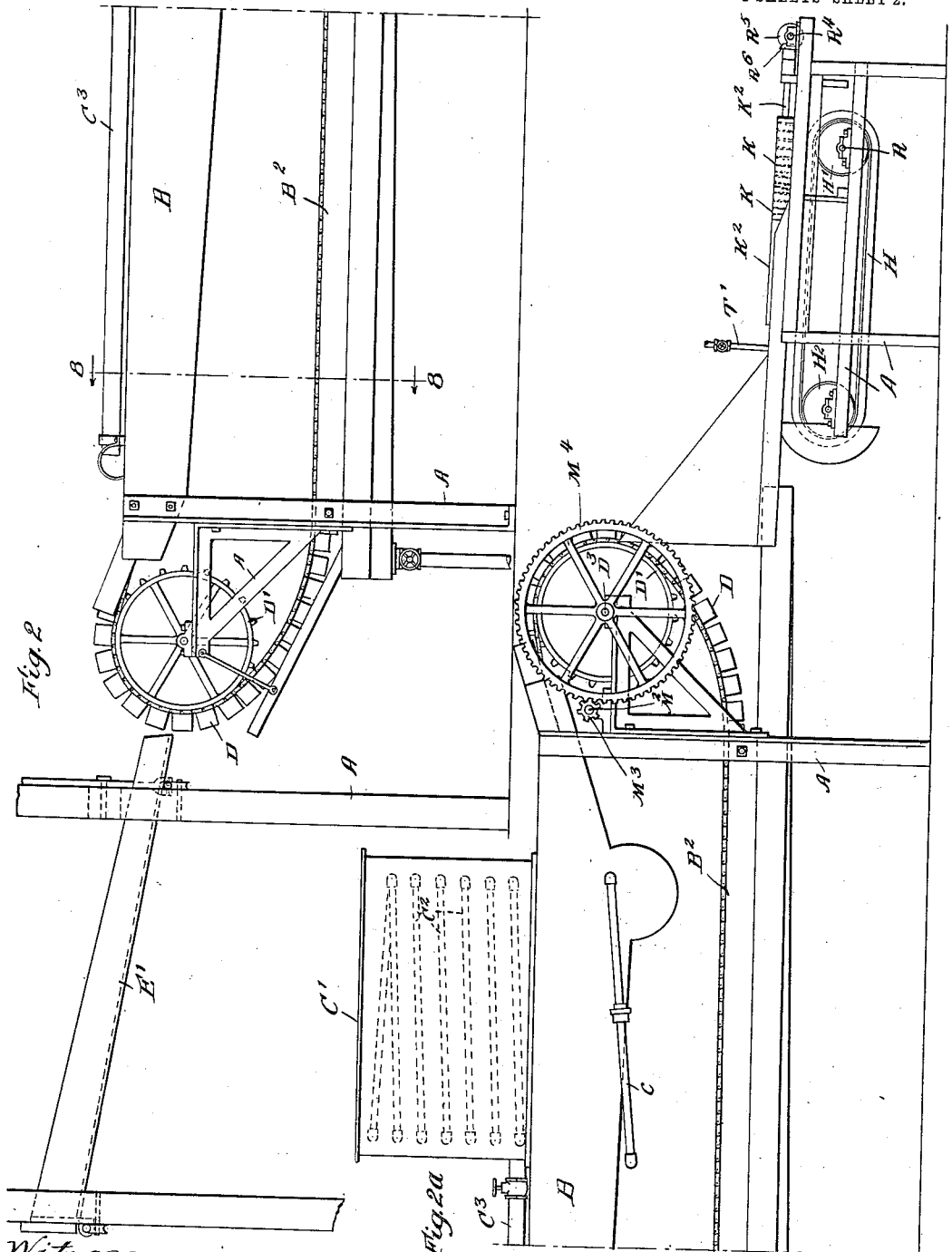

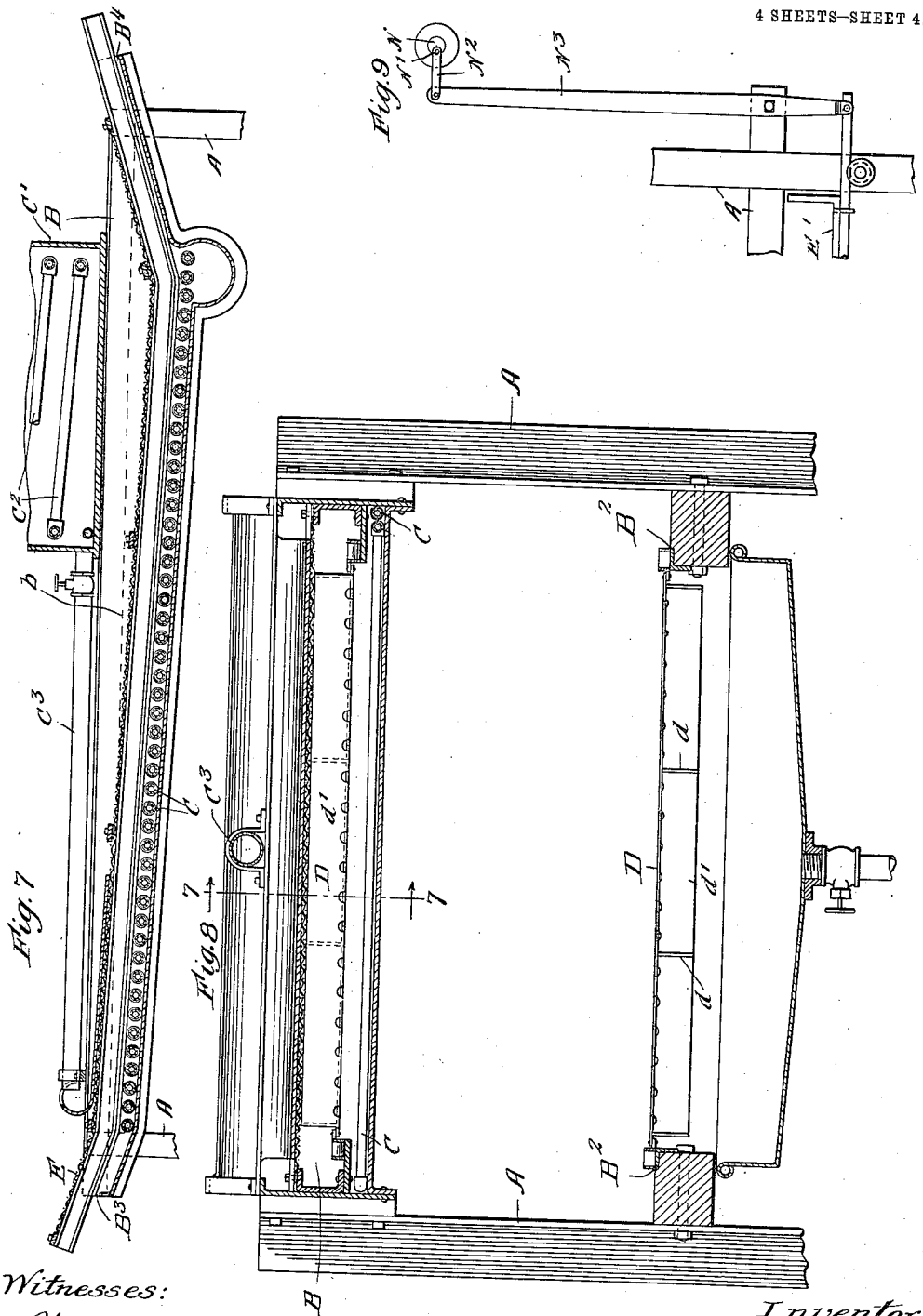

UNITED STATES PATENT OFFICE.

SAMUEL J. DUNKLEY, OF KALAMAZOO, MICHIGAN, ASSIGNOR, BY MESNE ASSIGNMENTS, TO DUNKLEY COMPANY, OF KALAMAZOO, MICHIGAN, A CORPORATION OF MICHIGAN.

MACHINE FOR PEELING PEACHES AND OTHER FRUIT.

1,104,175.  Specification of Letters Patent.  Patented July 21, 1914.

Application filed November 29, 1904. Serial No. 234,715.

*To all whom it may concern:*

Be it known that I, SAMUEL J. DUNKLEY, a citizen of the United States, residing in Kalamazoo, in the county of Kalamazoo and State of Michigan, have invented a new and useful Improvement in Machines for Peeling Peaches and other Fruit, of which the following is a specification.

My invention relates to machines for peeling peaches, or other fruit or vegetables.

The object of my invention is to provide a machine or apparatus of a simple, efficient and durable construction, by means of which peaches, or other fruit or vegetables, may be automatically peeled very rapidly and cheaply, and without injury to or mutilation of the fruit or the like, and by which also the skin or peel may be removed without waste of the pulp.

My invention consists in the means I employ to practically accomplish this object or result; that is to say it consists, in combination with a peel or skin softening, disintegrating or shriveling means or device, preferably consisting of a tank or chamber containing a heated fluid, and a heater for the same, a conveyer for automatically conveying the peaches through the skin softening, disintegrating or shriveling device and subjecting the peaches to its action for uniform and measured time, a chute or device for delivering the peaches in single file line to a brushing and washing mechanism, and a peach brushing and washing mechanism, preferably comprising a group of three long perforated pipes for spraying water upon the moving line of peaches, and subjecting them to a water brushing action, an endless belt brush arranged between the two lowermost perforated pipes and operating to brush the peaches as they are rotated and to convey them along, and a pair of oppositely rotating cylindrical brushes operating both to rotate and brush the peaches, and having hollow perforated pipe cores for spraying the rotary brushes with water, and rotary cylindrical rubber sponge brushes, also having hollow perforated pipe cores for supplying the same with water; whereby the peaches may be very rapidly and cheaply and perfectly peeled, without waste or injury.

My invention also consists in the novel construction of parts and devices and in the novel combination of parts and devices herein shown or described.

In the accompanying drawing, forming a part of this specification, Figures 1 and 1ª, taken together, are a plan of a peach peeling machine embodying my invention; Figs. 2 and 2ª, taken together, a side view; Fig. 3 is a detail section on line 3—3 of Fig. 1ª; Fig. 4 is a detail plan view showing one set of brushing and washing devices; Fig. 5 is a cross section on line 5—5 of Fig. 3; Fig. 6 is a cross section on line 6—6 of Fig. 3; Fig. 7 is a detail longitudinal section through the tank, the conveyer being omitted, on line 7—7 of Fig. 8; Fig. 8 is a cross section on line 8—8 of Fig. 2; Fig. 9 is a detail elevation of the chute or hopper shaking mechanism.

In the drawing A represents the frame of the machine, B is a tank or chamber containing a heated fluid $b$ for softening, disintegrating, loosening or shriveling the skin of the peaches as they are conveyed through the tank. The fluid $b$ in the tank or chamber B is preferably a liquid, and composed of water with an alkaline material in solution.

C is a heater for heating the skin softening, loosening or disintegrating medium $b$, the heater preferably consisting of steam pipes or coils in the tank, and connected with a steam supply pipe $c$. The skin softening, loosening or disintegrating liquid is contained in a reservoir $C^1$, having a heater $C^2$, and is delivered to the tank B, as required, through a supply pipe $C^3$.

D is a conveyer for conveying the peaches into, through and out of the skin softening, loosening or disintegrating liquid $b$ in the tank B. This conveyer or carrier D is, preferably, an endless conveyer traveling on pulleys $D^1$ $D^1$, one at each end of the tank B, and provided with transverse webs $d$ and longitudinal webs $d$, dividing the same into a series of buckets or receptacles, each adapted to hold several peaches, say six or eight, in a transverse row, and thus cause the conveyer D to automatically arrange the peaches in a single layer therein, and cause them to be uniformly subjected to the action of the skin disintegrating medium $b$.

The tank B is provided with guides or tracks $B^1$ $B^2$, for guiding and supporting the endless flexible conveyer D. The upper guide $B^1$ has a downward incline $B^3$ at the entrance end of the tank, and an upward incline B⁴ at the exit from the tank. E is an open screen, preferably of wire netting, secured to the tank A just above the path of the upper run of the endless peach conveyer D, to hold the peaches in the open buckets or pockets of the conveyer and prevent the same from floating to the top of the skin softening, loosening or disintegrating liquid.

E¹ is a feed chute or hopper having partitions E² into which the peaches are emptied in bulk, and by which they are fed or delivered to the endless conveyer D. As the endless conveyer D passes over or around the pulley or wheel D¹ at the exit end of the tank, the peaches are automatically delivered into the inclined and tapering chutes F, one for each longitudinal partition of the conveyer, and thus caused to feed or be delivered in single file between the water pipes and brushes of the washing and brushing mechanism by which the softened, loosened, disintegrated or shriveled skins of the peaches are removed, and the peaches thoroughly washed and freed from all taint or trace of the skin disintegrating or loosening liquid. This washing or brushing mechanism comprises a group of, preferably, three water pipes G, having a series of perforations $g$ arranged to strike the peaches as they are conveyed along between the pipes, and thus to impart to the peaches a rotary movement. The washing and brushing mechanism further, preferably, comprises an endless belt brush H, traveling on pulleys H¹ H² between the two lowermost water pipes G G, and by which the peaches are conveyed along in single file and simultaneously brushed as they are rotated. This washing and brushing mechanism further, preferably, comprises a pair of oppositely rotating cylindrical brushes K K¹, each having a hollow perforated water pipe K² for flooding the brushes with water as they rotate. The bristles or brushing material $k$ of the brushes K K¹, may be of any suitable material, but preferably of vegetable fiber. The bristles or brushing material on the cylindrical brush K¹ are, preferably spirally disposed, and the two brushes K K¹ are rotated at different speeds to aid in turning or rotating the peaches as they are conveyed along between the brushes. For a portion of their length the rotary brushes K K¹ are preferably provided with soft rubber sponge brushing material $k^2$, the back or base web $k^3$ of which is provided with perforations $k^4$ to flood the rubber sponge material with water from the pipe K². If desired, this rubber sponge brushing material $k^2$ may be used for the entire length of the rotary brushes K K¹, although I prefer to employ a bristle-like brushing material for a portion of the length of these rotary brushes.

In practice for firm meated fruit or vegetables the use of fiber brushes for the entire length has been found highly satisfactory and is the most economical. The perforated water pipes G G G, preferably extend beyond the rotary brushes K K¹, so that the water spray may entirely free the surface of the peaches and the like from any particles of skin or peel.

The required movements may be imparted to the several moving parts of my machine by any suitable means or mechanism. The endless conveyer D is preferably driven continuously and at a slow speed, timed to subject the peaches to the action of the hot liquid $b$ just for the time required to disintegrate and loosen the peel of the peach without softening or cooking the pulp beneath the skin to an appreciable depth or extent, by means of a belt M and driving pulley M¹ on the driving shaft M² and gears M³ M⁴, the gear M⁴ being on the shaft D³ of the conveyer sprocket wheels.

The peach feed chute or hopper E is given a horizontal shaking or vibratory movement from the shaft N through the crank N¹, pitman N² and lever N³. This shaking means is not needed for round fruit or vegetables. The several endless belt brushes H are driven continuously from the driving shaft R through the pulley R¹, the pulleys G¹ of the belt brushes at one end being on the shaft R.

Continuous rotary motion is communicated to the rotary brushes, K¹ K¹ from the driving shaft R through a twisted belt R² and pulley R³ on the shaft R⁴, having beveled gears R⁵ meshing with the bevel gears R⁶ on the hollow water pipe shafts K² of the rotary brushes. Water under pressure is supplied to the hollow shafts of the several rotary brushes from the supply pipe T, having branches $t$ leading to each of the rotary brushes and connected to its hollow core or shaft by stuffing boxes $t^1$. The water supply pipe T¹ also has branches $t^3$ leading to the perforated water pipes G.

The water peeling means here shown are available wherever the skin of the fruit or vegetable has been suitably disintegrated or loosened. The particular alkaline treatment is highly effective but I am sure that this may be accomplished otherwise and clearly when the skin of fruit or vegetable is disintegrated the spray means shown will do the work of peeling the same. I desire, therefore, to claim the means to remove the disintegrated peel no matter how the disintegration is accomplished. I desire to claim the means specifically as a peach peeling means, and also generally, the apparatus having been designed especially for peaches and having been found applicable to other work without change.

My entire apparatus is especially designed to subject the skin of the peach or fruit or vegetable to the disintegrating solution or means for the briefest possible period that will accomplish the desired result.

I claim:

1. In a peach peeling machine, the combination with a tank or chamber for containing a fluid for softening and loosening the skins, of means which extend through the tank for subjecting the same to the action of said fluid for a uniform period of time, and a washing, spraying and brushing mechanism at the exit end of the tank for removing the softened and loosened skins, coöperating substantially as described.

2. In a peach peeling machine, the combination with a skin-softening and loosening device, of a washing, spraying and brushing device, coöperating substantially as specified.

3. In a peach peeling machine, the combination with means for softening and loosening the skins, with means for washing, spraying and brushing the peaches, and thus removing the skins, and means for automatically delivering the same from said skin-softening and loosening means to said washing and brushing means, substantially as specified.

4. In a peach peeling machine, the combination with means for softening and loosening the skins of same, with means for washing, spraying and brushing same and thus removing the skins, means for automatically delivering them from said skin-softening and loosening means to said washing and brushing means, and a hopper or chute for automatically delivering the peaches to said skin-softening and loosening means, substantially as specified.

5. In a peach peeling machine, the combination with a tank for containing a skin-softening and loosening liquid, of a heater therefor, a conveyer passing through the tank for conveying the peaches into, through and out of said liquid, and a group of perforated water pipes for spraying the peaches with water as they pass lengthwise of and between said pipes, substantially as specified.

6. In a peach peeling machine, the combination with a tank for containing a skin-softening and loosening liquid, of a heater therefor, a conveyer passing through the tank for conveying the peaches into, through and out of said liquid, a group of perforated waterpipes at the discharge end of said conveyer for spraying the peaches with water as they pass lengthwise of and between said pipes, and an endless conveyer arranged longitudinally of and between two of said pipes, substantially as specified.

7. In a peach peeling machine, the combination with a tank for containing a skin-softening and loosening liquid, of a heater therefor, a conveyer passing through the tank for conveying the peaches into, through and out of said liquid, a group of perforated water pipes at the discharging end of said conveyer for spraying the fruit with water as it passes lengthwise of and between said pipes, and an endless conveyer brush arranged longitudinally of and between two of said pipes, substantially as specified.

8. In a peach peeling machine, the combination with a tank for containing a skin-softening and loosening liquid, of a heater therefor, a conveyer passing through the tank for conveying the peaches into, through and out of said liquid, a group of perforated water pipes at the discharging end of said conveyer for spraying the peaches with water as they pass lengthwise of and between said pipes, and an endless conveyer brush arranged longitudinally of and between two of said pipes, and rotary cylindrical brushes for brushing and turning the peaches as they pass between said water pipes, substantially as specified.

9. In a peach peeling machine, the combination with a tank for containing a skin-softening and loosening liquid, of a heater therefor, a conveyer passing through the tank for conveying the peaches into, through and out of said liquid, a group of perforated water pipes at the discharging end of said conveyer for spraying the peaches with water as they pass lengthwise of and between said pipes, and an endless conveyer brush arranged longitudinally of and between two of said pipes, and rotary cylindrical brushes for brushing and turning the peaches as they pass between said water pipes, said rotary cylindrical brushes having hollow perforated water pipe cores, substantially as specified.

10. In a peach peeling machine, the combination with a tank for containing a skin-softening and loosening liquid, of a heater therefor, a conveyer passing through the tank for conveying the peaches into, through and out of said liquid, a group of perforated water pipes at the discharging end of said conveyer for spraying the peaches with water as they pass lengthwise of and between said pipes, and an endless conveyer brush arranged longitudinally of and between two of said pipes, and rotary cylindrical brushes for brushing and turning the peaches as they pass between said water pipes, the brushing material of one of said cylindrical brushes being spirally disposed thereon to aid in turning the peaches, substantially as specified.

11. In a peach peeling machine, the combination with a tank for containing a skin-softening and loosening liquid, of a heater therefor, a conveyer passing through the tank for conveying the peaches into, through and out of said liquid, a group of perforated water pipes at the discharging end of said conveyer for spraying the peaches with water as they pass lengthwise of and between said pipes, and an endless conveyer brush arranged longitudinally of and between two of said pipes, and rotary cylindrical brushes for brushing and turning the peaches as they pass between said water pipes with means for rotating said cylindrical brushes in opposite directions, substantially as specified.

12. In a peach peeling machine, the combination with a tank for containing a skin-softening and loosening liquid, of a heater therefor, a conveyer passing through the tank for conveying the peaches into, through and out of said liquid, a group of perforated water pipes at the discharging end of said conveyer for spraying the peaches with water as they pass lengthwise of and between said pipes, means for delivering the peaches from said tank in a row or single file to said pipes, and rotary cylindrical brushes for brushing and turning the peaches as they pass between said water pipes, and means for rotating said cylindrical brushes in opposite directions and at different speeds, substantially as specified.

13. In a peach peeling machine, the combination with a tank for containing a skin-softening and loosening liquid, of a heater therefor, a conveyer passing through the tank for conveying the peaches into, through and out of said liquid, a group of perforated water pipes at the discharging end of said conveyer for spraying the peaches with water as they pass lengthwise of and between said pipes, and an endless conveyer brush arranged longitudinally of and between two of said pipes, rotary cylindrical brushes for brushing and turning the peaches as they pass between said water pipes, and means for rotating said cylindrical brushes in opposite directions and from each other, substantially as specified.

14. In a peach peeling machine, the combination with a tank for containing a skin-softening and loosening liquid, of a heater therefor, a conveyer passing through the tank for conveying the peaches into, through and out of said liquid, a group of perforated water pipes at the discharging end of said conveyer for spraying the peaches with water as they pass lengthwise of and between said pipes, and a chute or hopper for automatically delivering the peaches to the tank conveyer, substantially as specified.

15. In a peach peeling machine, the combination with a tank for containing a skin-softening and loosening liquid, of a heater therefor, a conveyer passing through the tank for conveying the peaches into, through and out of said liquid, a group of perforated water pipes at the discharging end of said conveyer for spraying the peaches with water as they pass lengthwise of and between said pipes, a chute or hopper for automatically delivering the peaches to the tank-conveyer, and a chute or device for automatically delivering the same from said tank-conveyer in a single file, line or row to and between said water pipes, substantially as specified.

16. In a peach peeling machine, the combination with a tank for containing a skin-softening and loosening liquid, of a heater therefor, a conveyer passing through the tank for conveying the peaches into, through and out of said liquid, a group of perforated water pipes at the discharging end of said conveyer for spraying the peaches with water as they pass lengthwise of and between said pipes, and a screen under which the upper run of the conveyer passes for holding the peaches immersed in the liquid as they are carried through the same by the conveyer, substantially as specified.

17. In a peach peeling machine, the combination with a tank for containing a skin-softening and loosening liquid, of a heater therefor, a conveyer passing through the tank for conveying the peaches into, through and out of said liquid, a group of perforated water pipes at the discharging end of said conveyer for spraying the peaches with water as they pass lengthwise of and between said pipes, an endless conveyer brush arranged longitudinally of and between said pipes, rotary cylindrical brushes for brushing and turning the peaches as they pass between said water pipes, said rotary cylindrical brushes having hollow perforated water pipe cores, said rotary cylindrical brushes having a fibrous brushing material for a portion of their length, and a rubber sponge brushing material for a portion of their length, substantially as specified.

18. In a peach peeling machine, the combination with a tank for containing a skin-softening and loosening liquid, of a heater therefor, a conveyer passing through the tank for conveying the peaches into, through and out of said liquid, a group of perforated water pipes at the discharging end of said conveyer for spraying the peaches with water as they pass lengthwise of and between said pipes, rotary cylindrical brushes for brushing and turning the peaches as they pass between said water pipes, said rotary cylindrical brushes having hollow perforated water pipe cores, and said rotary cylindrical brushes having a fibrous brushing material, substantially as specified.

19. In an apparatus for treating fruit such as peaches, means for removing previously disintegrated skin from the fruit, including a support for the fruit, means for effecting a change of position of the fruit on said support, and means for directing peeling water jets upon said fruit.

20. In an apparatus for removing the previously disintegrated skin from fruit, the combination with means for supporting and advancing the fruit, of means for directing a peeling water jet upon said fruit as it advances.

21. In an apparatus for removing the previously disintegrated skin from fruit, the combination with means for supporting and advancing the fruit, of means for directing peeling jets of water at intervals upon said fruit as it advances.

22. In an apparatus for removing the previously disintegrated skin from fruit, the combination with means for supporting and advancing the fruit, of means for directing peeling jets of water at intervals upon said fruit from above and below as it advances.

23. In a peeling machine for removing the previously disintegrated skin from fruit or vegetables, means for directing water sprays against the separate specimens thereof, and means for turning the said specimens to present all parts thereof to the spray for the purpose specified.

24. In a peeling machine for removing the previously disintegrated skin from fruit or vegetables, means for directing the water sprays against the separate specimens thereof, and a support with means for turning the said specimens to present all parts thereof to the spray for the purpose specified.

25. In a peach peeling machine for removing the previously disintegrated skin from fruit or vegetables, means for directing water sprays against the separate specimens thereof, and means for turning the said specimens to present all parts thereof to the spray for the purpose specified.

26. In a peach peeling machine for removing the previously disintegrated skin from fruit or vegetables, means for directing the water sprays against the separate specimens thereof, and a support with means for turning the said specimens to present all parts thereof to the spray for the purpose specified.

SAMUEL J. DUNKLEY.

Witnesses:
H. M. MUNDAY,
EDMUND ADCOCK.